United States Patent [19]

Schmader

[11] 4,189,994
[45] Feb. 26, 1980

[54] METHOD AND APPARATUS FOR USE IN FRYING DOUGHNUTS

[76] Inventor: Richard W. Schmader, 50 Myopia Rd., Winchester, Mass. 01890

[21] Appl. No.: 893,058

[22] Filed: Apr. 3, 1978

[51] Int. Cl.² ............................................. A47J 37/12
[52] U.S. Cl. ....................................... 99/405; 99/354; 99/406
[58] Field of Search ................. 99/403, 404, 405, 406, 99/407, 354, 352, 443 C; 432/439, 441

[56] References Cited

U.S. PATENT DOCUMENTS

| | | | |
|---|---|---|---|
| 3,733,202 | 5/1973 | Marmor | 99/404 |
| 3,882,768 | 5/1975 | Troisl | 99/352 |

FOREIGN PATENT DOCUMENTS 669487 8/1963 Canada ........................................ 99/405

*Primary Examiner*—Edward J. McCarthy

[57] ABSTRACT

Doughnut frying apparatus has a conveyor extending lengthwise of the hot oil tank and provided with transverse flights with its upper course disposed to carry floating doughnuts from a transverse pickup zone near the infeed or rear end of the tank towards the outfeed end thereof. Successive series of uncooked doughnuts are delivered into the tank in a transverse receiving zone spaced rearwardly of the pickup zone. Means are employed to enable the interval between the delivery of successive series to be minimized by circulating hot oil to provide a stream flowing upwardly through the receiving zone and into the pickup zone preferably also with an air stream directed close to but above the surface of the oil and forwardly through the delivery zone.

10 Claims, 3 Drawing Figures

METHOD AND APPARATUS FOR USE IN FRYING DOUGHNUTS

BACKGROUND REFERENCES

U.S. Pat. Nos. 1,808,215, 3,283,695, 3,733,202, 3,882,768.

BACKGROUND OF THE INVENTION

In the commercial production of doughnuts, the frying station has a tank and means to maintain the oil at a desired temperature. Uncooked doughnuts are entered into the hot oil at the rear end of the tank and means are provided to convey the doughnuts to the forward end of the tank with the doughnuts turned over midway of their travel.

In practice, the conveyors used are provided with appropriately spaced flights and a plurality of transversely spaced doughnuts are entered into the hot oil at the same time and these are to be carried through the hot oil as a group. As doughnuts sink when first entered into the oil and then rise to the surface, it is necessary to provide means to ensure that all the doughnuts of each group are in fact engaged by the same conveyor flight.

In accordance with U.S. Pat. No. 3,882,768, the uncooked doughnuts are deposited in screen bottomed trays and carried by a conveyor through a proofing station with the conveyor then immersing each tray successively into the hot oil in a receiving zone at the rear end of the tank. The doughnuts, as they float free from a tray to the surface, are transferred forwardly into the pickup zone by an air stream then to be picked up by an appropriate one of the conveyor flights.

While it is obvious that doughnuts must be in the frying tank for a predetermined interval and, where the doughnuts are conveyed to the frying tank through a proofing chamber, they must, of course be in the proofing chamber for a predetermined interval, increased production can be achieved with relatively inexpensive modification of apparatus having one capacity if the interval between the delivery of successive series of doughnuts into the hot oil can be decreased and still ensure that the doughnuts of each series will be out of the path of the next entering series.

When doughnuts are delivered into the hot oil on screen bottomed trays on which they are deposited by a doughnut forming depositor, there are advantages over the dropping of doughnuts into the oil. One such advantage is that their shape is protected by the tray and another advantage is that they are held close to the surface of the hot oil. A disadvantage exists, however, in that although the trays are Teflon coated, doughnuts sometimes stick to the screen. When doughnuts are deposited on the trays, they are soft enough so that even when cooked, a slight impression of the screen can be seen. Under certain conditions, dough may penetrate the screen to an extent that prevents a doughnut from floating free.

There is need, accordingly, not only for means enabling the interval between the delivery of successive series of doughnuts into the hot oil to be minimized to increase production but also when, as is preferred, the doughnuts are delivered by trays into the hot oil, ensuring all the doughnuts of a series will start towards the surface at substantially the same time.

THE PRESENT INVENTION

The general objective of the invention is to provide methods and apparatus by which all of the doughnuts of each series delivered into the hot oil in a receiving zone adjacent the rear end of the tank are carried at the same time and at the same rate from the receiving zone and forwardly into the pickup zone where each series of doughnuts is to be picked up by the appropriate one of the flights of the conveyor by which the doughnuts are carried to the other end of the frying tank.

In accordance with the invention, this objective is attained by circulating hot oil to provide a hot oil stream that flows upwardly through the receiving zone and forwardly into the pickup zone. The functions of the hot oil stream include that of enabling the interval between the delivery of successive series of doughnuts to be substantially reduced by ensuring that a delivered series is out of the way of the next-to-be delivered series thus to permit the interval to be limited essentially to the rate at which the doughnuts become buoyant and rise to the surface since the stream flows both upwardly and forwardly thereby enabling said intervals to be within the approximate range of from 1.5 to 3.5 seconds depending on the formulation used.

A further objective of the invention is to provide a second fluid stream in the form of a curtain like air stream directed forwardly through the receiving zone close to and parallel to the surface of the forwardly flowing hot oil stream.

Another objective of the invention is to ensure that doughnuts introduced into the tank become buoyant in the shortest possible time, an objective attained by providing that the oil stream is at the optimum temperature when it passes through the delivery zone.

Yet another objective of the invention is to ensure that, when a plurality of doughnuts are carried into the hot oil in trays, none adheres thereto, an objective attained with the jets of hot oil forming the stream, of a force and direction such that any doughnut that might otherwise adhere to its tray is dislodged, at least when it should be buoyant, a feature of importance regardless of whether the interval between the delivery of successive series is within or without the above referred-to range.

BRIEF DESCRIPTION OF THE DRAWINGS

The accompanying drawings illustrate a preferred embodiment of the invention and—

THE PREFERRED EMBODIMENT OF THE INVENTION

Figure 1:
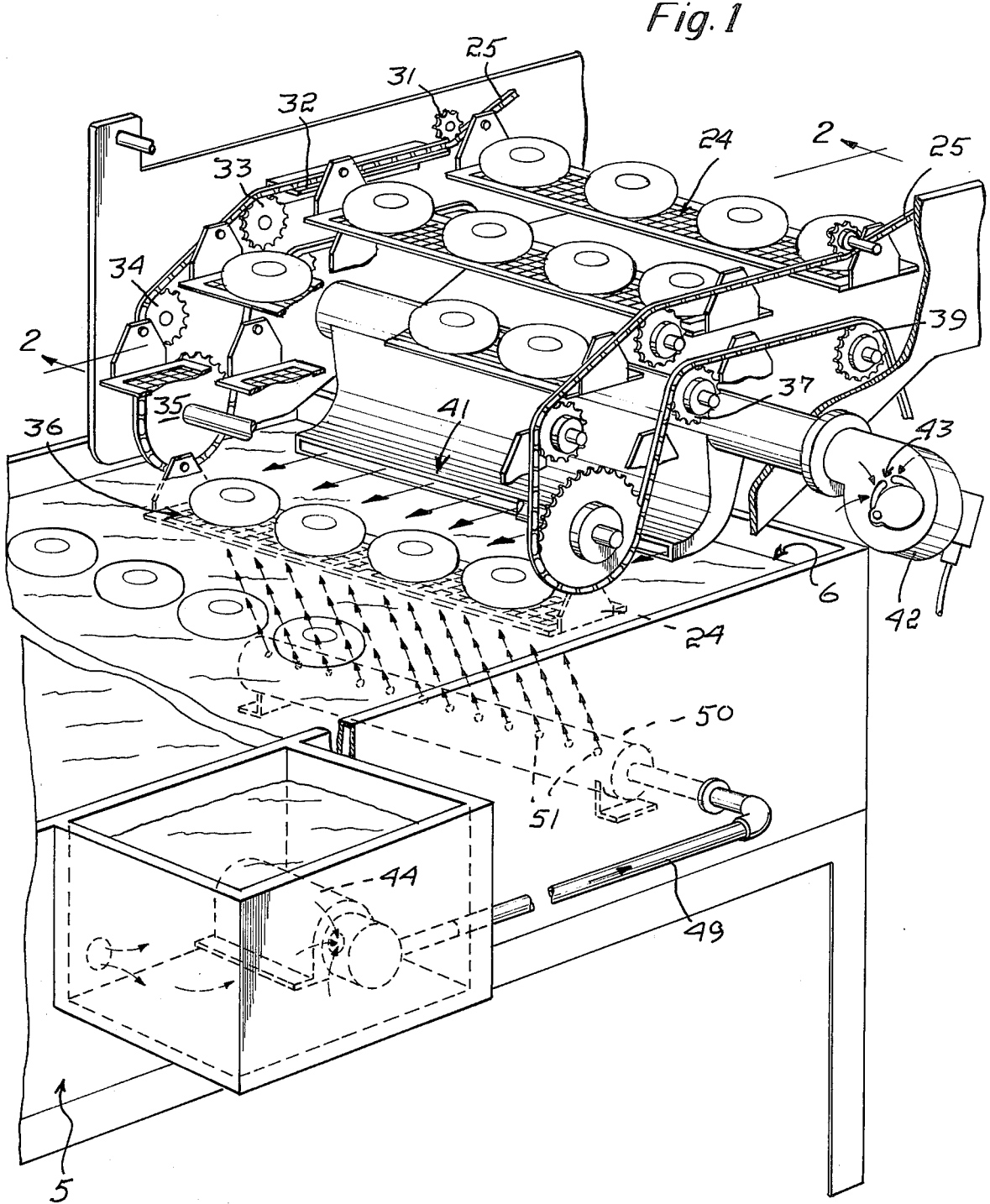
FIG. 1 is a fragmentary, perspective view of a conveyor carrying doughnuts in pivotally supported trays which are successively immersed in the receiving zone of a frying tank, shown as equipped with means directing a hot oil stream upwardly through and forwardly from the receiving zone and a blower to direct an air stream forwardly through the receiving zone but above the surface of the hot oil.
Figure 2:
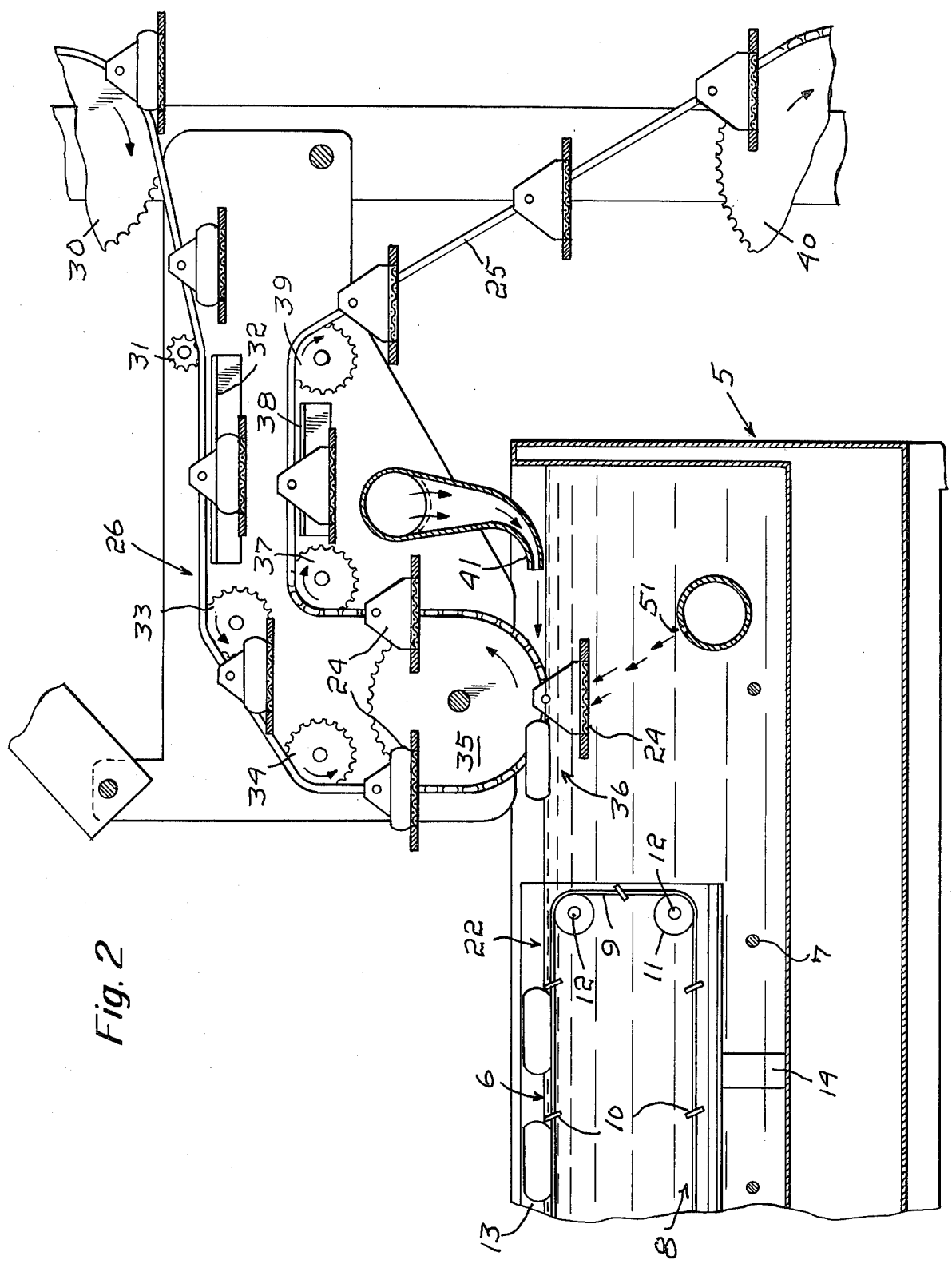
FIG. 2 is a section taken approximately along the indicated line 2—2 of FIG. 1 and also showing the pickup zone at the infeed end of the conveyor in the frying tank and the relationship of the two zones.

A doughnut fryer has a tank 5 that is to be filled with hot oil to a wanted level 6 and has heating coils 7 extending along its bottom. A conveyor, generally indicated at 8, is shown schematically and is of the type having a pair of chains 9 interconnected by flights 10 and trained about sprockets 11, corresponding sprockets carried by shafts 12 which are journalled in side walls 13 provided with legs 14 resting on the bottom of the tank 5 thus providing a unit that may be removed from the tank. The walls 13 include the sides of a drain 15 extending upwardly and outwardly from the front end of the tank. A shaft 16 at the outer end of the drain is driven by a motor 17, and is provided with a pair of sprockets 18 about which the chains 9 are trained. A wire belt 19, trained about the shaft 16 and a shaft 20 supported by the walls 13 within the tank, has the function of supporting the cooked doughnuts and permitting drainage while they are being advanced by the conveyor flights. A device 21 is supported by the walls 13 midway of the tank 5 and is operable to turn the doughnuts over either by the flights or the chains of the conveyor 8. In practice, the cooked doughnuts are discharged from the outer end of the drain 15 onto a conveyor, not shown, by which they are carried to another station.

It will be noted that the upper course of the conveyor 8 is in a position such that its flights 10 will engage floating doughnuts but that its infeed end is located a substantial distance from the rear end of the tank so that doughnuts are not advanced by the conveyor unless they are in a pickup zone, generally indicated at 22.

Figure 3:
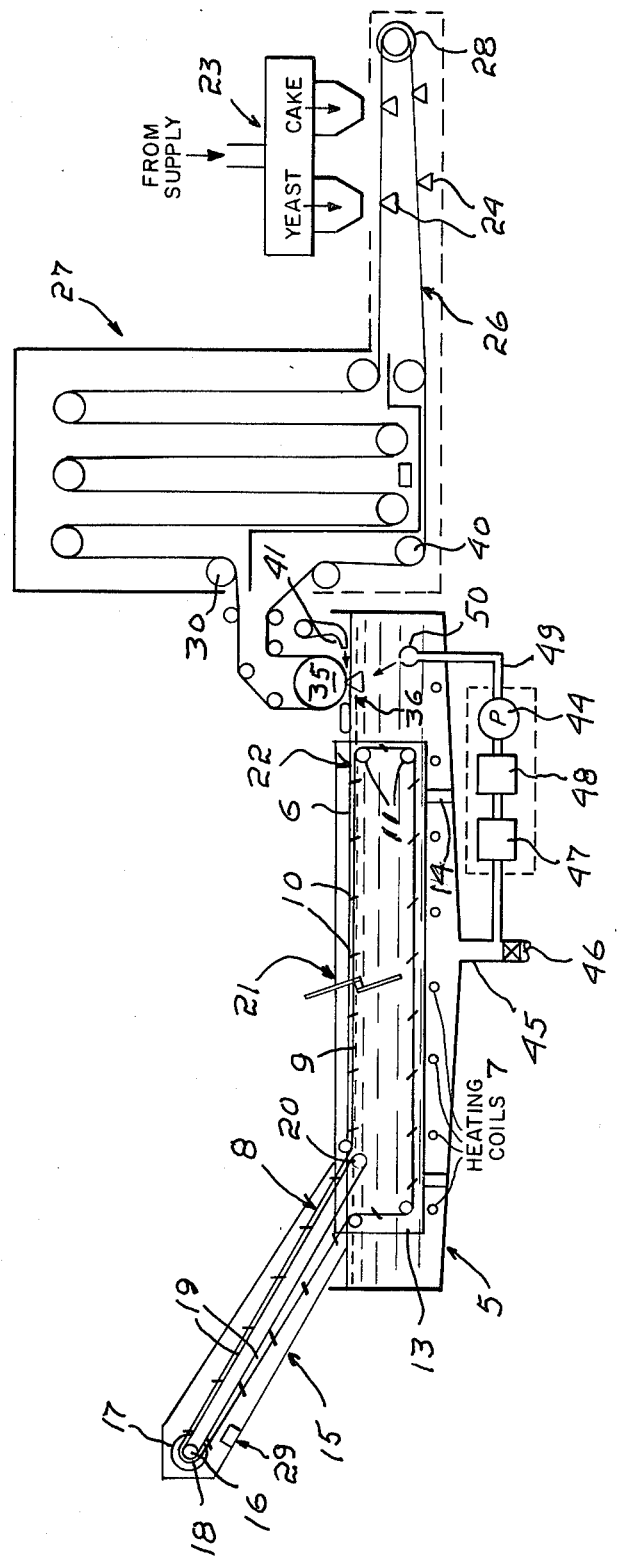
FIG. 3 is a schematic view of apparatus by which doughnuts are continuously produced with the frying tank in accordance with the present invention.

While the invention is not limited to doughnut making systems in accordance with U.S. Pat. No. 3,882,768, such a system is schematically illustrated in FIG. 3. In brief, such a system includes a depositor 23, which may be in accordance with U.S. Pat. No. 3,708,255 and which receives dough from a supply source which desirably is in accordance with U.S. Pat. No. 4,061,314. The depositor 23 simultaneously deposits a group of doughnuts, four in the disclosed embodiment, on the screen bottomed trays 24 carried by the chains 25 of a delivery conveyor, generally indicated at 26. One course of the conveyor 26 passes through a proofing chamber 27, towards the frying tank 5 in the case of yeast doughnuts, and the other course passes below the proofing chamber 27. The direction of the conveyor is reversed when cake doughnuts are being produced so that they bypass the proofing chamber. The drive for the conveyor 26 is generally indicated at 28 and is operated by step-by-step in either direction with predetermined dwells with the operation controlled by the engagement of the flights 10 of the conveyor 8 with a micro switch 29 mounted on one of the arms of the chain 15.

The apparatus, as thus far described is or may be conventional and the conveyor 26 will not be detailed except as to that portion that overlies the rear of the tank 5.

The chains 25 at the outlet of the proofing chamber 27 are trained under sprockets 30 and then forwardly under sprockets 31 and along supports 32, over sprockets 33 and then forwardly and downwardly over sprockets 34 and about a sprocket 35 so positioned relative to the level of the oil in tha tank 5 that the trays 24 are dipped into the hot oil in the tank in a receiving zone 36 before they are lifted therefrom as the chains in the other course extend upwardly and about sprockets 37. The chains then extend rearwardly along supports 38, about the sprockets 39 and then downwardly about the sprockets 40 and thence under the proofing chamber 27.

Doughnuts, when first introduced into hot fat, sink but become buoyant in about 1.5 to 3.5 seconds, depending on the formulation and additional interval is required for the doughnuts to be moved from the receiving zone 36 into the pickup zone 22, a distance that depends on the outside diameter of the doughnuts. In the disclosed embodiment, the zone spacing required that the doughnuts travel approximately four inches. Where the interval between the immersion of successive trays into the hot oil is dictated by the construction of the proofing chamber to be in the seven to ten second range, zone to zone transfer can be effected by an air stream established by the nozzle 41 of a blower 42 shown as having adjustable air inlets 43, the nozzle extending transversely of the tank 5 rearwardly of the receiving zone 36 and in the form of a slot disposed and dimensioned to provide a curtain like air stream close to and parallel to the surface of the hot oil.

By way of example, with the conveyor 26 operated step-by-step in seven to ten second increments to provide that the doughnuts are in the proofing chamber for the required interval, about two seconds is required for the conveyor to travel one step, in practice four and one-half inches thus providing eight to five second dwells. Zone to zone transfers, with the exception of instances where a doughnut or doughnuts adhere to the trays, is, when such dwell periods are provided, satisfactorily effected by the air stream except when doughnuts adhere to the trays.

When increased production is required, the apparatus needs modification by increasing the number of flights 10 of the conveyor 8 and increasing the length of the conveyor 26 within the proofing chamber 27 to an extent permitting a wanted shorter interval between the delivery of successive series of doughnuts into the receiving zone 26. In order then to effect the movement of one series of doughnuts out of the way of the next series, hot oil is withdrawn from the tank 5 and discharged in the rear end thereof to provide a curtain like stream flowing upwardly through the receiving zone 36 and forwardly into the pickup zone 22.

To provide such a stream, oil is withdrawn by a pump 44 from the sump of the tank 5 via a drain pipe 45 having a normally closed valve 46 which is opened when the tank is to be drained. The withdrawn oil first passes through a filter 47 and preferably its temperature is raised by a heater 48 to the optimum level. The thus processed hot oil is then delivered through a pipe 49 to a tubular manifold 50 extending transversely of the rear end of the tank and having a lengthwise series of ports 51 through which the hot oil is discharged as jets providing the curtain-like stream having a velocity such as to ensure that all the doughnuts of each tray 24 are dislodged, at least when they should be buoyant, and simultaneously start their travel upwardly and forwardly thus enabling their zone-to-zone transfer to be effected more rapidly than when reliance is placed on an air stream. As the hot oil is effective to dislodge doughnuts that would otherwise adhere to trays, the hot oil stream may be used advantageously even if the acceleration of their transfer from the receiving zone 36 is not required. A further advantage is that, since the passage of the trays through the oil and the introduction of doughnuts therein would normally have a cooling influence, the hot oil stream ensures the most effective treatment of the doughnuts as they are immersed. The simultaneous use of an air stream is preferred particularly when the oil stream enters the receiving zone 36 in a nearly vertical direction.

I claim:

1. Apparatus for use in frying doughnuts, said apparatus including a tank for a predetermined volume of hot oil, an endless conveyor within said tank and extending lengthwise thereof and including transverse flights, the upper course of said conveyor traveling from a transverse pickup zone adjacent the rear end of the tank towards the other end of said tank with the flights at a level to engage and convey floating doughnuts at a rate such that the doughnuts are cooked when they reach said other end, means operable to deliver successive transverse series of uncooked doughnuts into the hot oil in a transverse receiving zone spaced rearwardly of said pickup zone with a predetermined time interval between the delivery of each series, the spacing of the conveyor flights related to said interval to render each flight operable to engage a series of doughnuts at the pickup zone, and means establishing at least one fluid stream operable to carry doughnuts from the receiving zone into said pickup zone at a rate such that the interval between the depositing of successive series may closely approach the rate at which the deposited doughnuts rise, said means including means operable to withdraw hot oil from the tank forwardly of the pickup zone and discharge it in said rear end in the form of a transverse series of jets directed to establish a curtain-like stream flowing upwardly through said receiving zone and forwardly into said pickup zone and operable to convey all the doughnuts of each delivered series away from the receiving zone during said interval.

2. The apparatus of claim 1 and in which the fluid stream establishing means also includes a blower including an outlet disposed transversely of the tank rearwardly of the receiving zone, said outlet dimensioned and disposed to provide a curtain-like air stream close to and parallel to the surface of the hot oil and directed towards the pickup zone.

3. The apparatus of claim 1 in which the means by which doughnuts are delivered into the hot oil includes a second endless conveyor of the type including a pair of chains, a series of transverse trays of screen stock hingedly connected to said chains, and supporting sprockets for said chains including sprockets located relative to the rear end of the tank in position such that the trays are successively immersed in the hot oil in said receiving zone, and the hot oil stream intercepts each tray when immersed.

4. The apparatus of claim 3 in which the fluid stream establishing means includes a blower including a nozzle disposed transversely of the tank rearwardly of the receiving zone and dimensioned and disposed to provide a curtain-like stream close to and parallel to the surface of the hot oil and directed towards the pickup zone.

5. The apparatus of claim 4 in which the oil stream is directed to so engage the bottom of each tray as to dislodge doughnuts upwardly therefrom at least when they should be buoyant.

6. The apparatus of claim 1 in which the interval between the delivery of each series of doughnuts into the receiving zone is in the approximate range of from 1.5 to 3.5 seconds.

7. The method of frying doughnuts that consists of the steps of depositing successive series of transversely aligned uncooked doughnuts into a transverse receiving zone adjacent the rear end of a tank containing hot oil, establishing a transverse pickup zone in said tank spaced forwardly of said receiving zone, conveying each series of doughnuts together from said pickup zone along the surface of the hot oil to the other end of said tank, and establishing at least one fluid stream operable to carry doughnuts from the receiving zone into said pickup zone by withdrawing hot oil from the tank in a zone forwardly of said two transverse zones and discharging said withdrawn hot oil as a curtain-like stream flowing upwardly through said receiving zone and forwardly into said pickup zone to effect the transfer of all of the doughnuts of the deposited series into the pickup zone at a predetermined rate such that the interval between the depositing of successive series may closely approach the rate at which the deposited doughnuts become buoyant.

8. The method of claim 7 and the additional step of providing a curtain-like air stream rearwardly of the receiving zone close to and parallel to the surface of the hot oil and directed towards the pickup zone.

9. The method of claim 8 in which each series of doughnuts is held by a screen as it is deposited in the hot oil and the hot oil stream is directed to impinge against the bottom of the screen and dislodge doughnuts therefrom at least when they should be buoyant.

10. The method of claim 7 in which the interval between each delivered series of doughnuts is within the approximate range of from 1.5 to 3.5 seconds.

* * * * *